United States Patent [19]
Waksberg et al.

[11] 3,780,296
[45] Dec. 18, 1973

[54] AUTOMATIC OPTICAL BIAS CONTROL FOR LIGHT MODULATORS

[75] Inventors: Armand Waksberg; John Irving Wood, both of Dollard Des Ormeaux, Quebec, Canada

[73] Assignee: RCA Limited, Ste. Anne De Bellevue, Quebec, Canada

[22] Filed: Dec. 22, 1972

[21] Appl. No.: 317,740

[52] U.S. Cl. ............ 250/201, 350/157, 331/94.5 S, 250/225
[51] Int. Cl. ............................................. G01j 1/20
[58] Field of Search............... 250/225, 216, 201, 250/205, 217; 331/94.5 S; 350/157; 356/114

[56] References Cited
UNITED STATES PATENTS

| | | | |
|---|---|---|---|
| 3,540,827 | 11/1970 | Badoz et al. | 350/157 X |
| 3,571,493 | 3/1971 | Baker | 250/201 X |
| 3,636,359 | 1/1972 | Hooper | 250/225 X |
| 3,701,583 | 10/1972 | Hammond | 350/157 |

Primary Examiner—Walter Stolwein
Attorney—Edward J. Norton

[57] ABSTRACT

In an electro-optic laser beam modulation system wherein the polarization modulation of the laser beam is converted into intensity modulation by an analyzer positioned in the path of the beam, a photo detector detects a portion of the output beam to provide an error signal which is a function of any change in the average intensity of the output beam from a given value. The error signal is used to control the birefringence of an optical compensation element, which is positioned in the path of the laser beam, to return the intensity of the output beam to the given value.

4 Claims, 2 Drawing Figures

AUTOMATIC OPTICAL BIAS CONTROL FOR LIGHT MODULATORS

BACKGROUND OF THE INVENTION

This invention relates to light modulators, and more particularly, to electro-optic crystal modulators wherein the output light intensity is maintained constant at a given value about which the modulation takes place.

It is conventional to employ electro-optic crystals for modulation of coherent laser radiation in, for example, pulse modulation communications systems. In conventional apparatus, a beam of coherent light from a laser is passed through a polarizer to polarize the light in a first plane. The polarized light is passed through an electro-optic crystal modulator which changes the instantaneous orientation of the plane of polarization of the beam in response to an electric field impressed on the electro-optic crystal. The light transmitted by the electro-optic crystal modulator impinges on an analyzer and is transmitted by the analyzer to an extent which is a function of the angle formed by the polarization direction of the analyzer and the instantaneous polarization direction of the laser beam impinging on the analyzer.

A serious problem occasioned by the use of electro-optic crystals as modulators is the variation in light output intensity caused by the change in birefringence of the crystal as a function of temperature. Heretofore, this problem has lead to various types of oven and control systems to alleviate this problem. One system relies on the sensing of a change of temperature at the crystal mount which is fed back as a correction signal to the heater assembly associated with the crystal mount. However, since these temperature sensing devices cannot sense the crystal temperature, but only some temperature at a point in close proximity, a continual drifting of the birefringence and a resulting variation in the depth of modulation of the transmitted light beam is experienced. Further, even if the crystal temperature were monitored accurately, a problem arises from the fact that it is the temperature in a small center portion of the crystal along the optical path which is important. For example, in lasers of the $CO_2$ type, the heating effect of the laser beam itself can produce large temperature differentials along the cross-section of the electro-optic crystal. Accordingly, sensing the temperature of the outside surface of the crystal is of doubtful value. In addition to the changes in birefringence of the crystal modulator caused by the crystal temperature variations, changes in temperature of any other component which is part of the modulator assembly may also produce changes in the intensity of the output light beam.

Other systems have been proposed to correct for thermal affects in electro-optic modulators by controlling the electric field bias applied to the modulator in response to a feedback signal. These systems utilize a low-frequency probe signal which is superimposed on the modulator bias and is detected by, for example, a photo-detector at the output of the laser modulator in order to develop an error signal which is a function of the deviation of the output from a maximum, or other desired optimum output, condition. The error signal is used to change the electric field bias applied to the modulator in order to restore the output to the maximum or desired optimum condition. These systems are sometimes adequate for low output level lasers and low modulation frequencies, as the temperature changes encountered in these electro-optic crystal modulator applications are relatively small. However, in the case of a high power laser such as, for example, a $CO_2$ laser, the modulator absorbs a substantial amount of heat from the laser beam itself. Additionally, at high modulation frequencies the modulating RF energy is also absorbed into the crystal material. This results in substantial changes in temperature which vary according to the type of modulation applied to the crystal modulator. Accordingly, the birefringence of the crystals and therefore the optical path length difference may change over many wavelengths. The voltages required to compensate for these changes ordinarily run into several tens of thousands of volts, which may be well above the dielectric strength of the electro-optic crystal material thereby resulting in a breakdown of the crystal material.

The present invention overcomes these disadvantages by providing an automatic compensation system which senses the true output intensity of the output beam and applies an error signal to an external birefringent compensation element, which acts independently of the electro-optic crystal to restore the output beam's intensity to a maximum or desired optimum condition.

SUMMARY OF THE INVENTION

Briefly, the present invention provides an electro-optic modulator comprising a light source for providing a polarized beam of light radiation, an electro-optic crystal modulator positioned in the path of the beam, with an electric field applied to the modulator to modulate the polarization state of the beam, and an analyzer positioned in the path of said beam to convert the polarization modulation of the beam into intensity modulation of the output beam emerging from the analyzer. A photo-detector is positioned to detect a portion of the intensity modulated output beam to provide an error signal which is a function of any variation in the intensity of the output beam about a given value. A birefringent optical compensation element is positioned external to the crystal modulator in the path of the light beam between the light source and the analyzer, the compensation element having a variable birefringence. Means are responsive to the error signal for controlling the birefringence of the compensation element to return the intensity of the output beam to the given value.

BRIEF DESCRIPTION OF THE DRAWING

The advantages of the present invention will become more readily appreciated as the same becomes better understood with reference to the drawing wherein.

DETAILED DESCRIPTION

Figure 1:
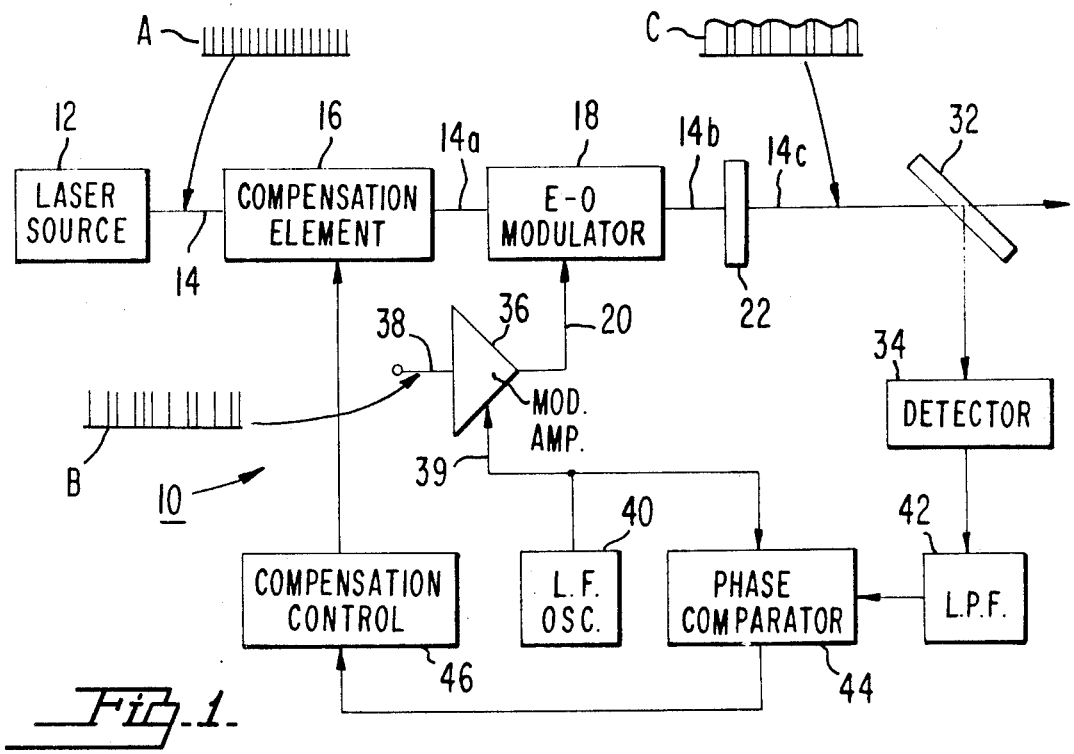
FIG. 1 is a block diagram of a preferred embodiment of a laser beam modulator in accordance with the present invention.

Referring now to FIG. 1 there is shown generally at 10 an electro-optic crystal modulator system in accordance with the present invention. A laser source 12 provides a linearly polarized beam 14 of light radiation of a given frequency. Beam 14 impinges on a transparent birefringent compensation element 16, which is transparent at the given laser frequency or wavelength, and passes therethrough. The output beam at 14a from element 16 is transmitted through an electro-optic crystal modulator 18, such as a Kerr cell, Faraday modulator, or Pockels cell, in which the light beam undergoes polarization modulation in response to an electric field being applied to the modulator by an electrical signal at an input 20. The output beam at 14b from modulator 18 is then transmitted through a conventional optical analyzer 22 for converting the beam's polarization modulation into intensity modulation. The intensity modulated output beam at 14c is transmitted through beam splitter 32 which may be, for example, a half-silvered mirror. Beam splitter 32 reflects a relatively small portion of beam 14c toward a detector 34. The main portion of the beam is transmitted through beam splitter 32.

The control input 20 of modulator 18 is coupled to the output of modulation-amplifier 36. An information signal input 38 of modulation-amplifier 36 is adapted for coupling to a suitable modulating signal source, not shown. A second input 39 of modulation-amplifier 36 couples a low-frequency monitoring signal from a low-frequency oscillator 40 into the input of modulation-amplifier 36.

The output of detector 34 is coupled to an input of a low-pass filter 42. The output of filter 42 is coupled to a first input of a phase comparator 44. A second output from low frequency oscillator 40 is coupled to a second input of phase comparator 44. The output of phase comparator 44 is coupled to compensation control 46. The output of compensation control 46 is coupled to compensation element 16.

Source 12 may comprise a laser source, or any other suitable source of electromagnetic radiation, which provides a polarized light output beam such as, for example, a laser cavity equipped with Brewster windows. Alternatively, source 12 may comprise a laser, or any other electro-magnetic source, having an unpolarized output which is cascaded with one or more polarizers to provide a polarized output beam.

The operation of system 10 of FIG. 1 is described as follows. The output beam 14 of laser source 12 is graphically represented at A as comprising polarized output pulses. The beam is transmitted through compensation element 16 which is a transparent birefringent material. The linearly polarized beam 14 is resolved into an ordinary and an extraordinary component within birefringent element 16. As the beam passes through birefringent element 16, a phase difference is introduced between the ordinary and extraordinary components of the beam. The total phase difference introduced is a function of the optical path length of element 16 and its ordinary and extraordinary indices of refraction, $N_o$ and $N_e$ respectively. The output beam 14a of element 16 exhibits a polarization which is dependent upon the birefringent characteristics of element 16. The beam 14a is transmitted through modulator 18 wherein the output beam 14b of modulator 18 exhibits a varying instantaneous polarization direction in accordance with the electric field applied to modulator 18 by an electrical modulating signal at input 20 of modulator 18. The modulation signal at input 38 of modulation-amplifier 36 is graphically represented at B. The modulating signals at B are shown as pulse code modulated or PCM signals. The magnitude of the modulating signals at the output of modulation-amplifier 36 is arranged to rotate the output beam 14b so that the intensity modulated output beam 14c is in one of two binary states. That is, the output beam 14c is either maximum or minimum in accordance with the modulating signal format at input 38 of modulation-amplifier 36.

The output of low frequency oscillator 40 is a relatively low-amplitude, low-frequency signal which superimposes a monitoring signal on the output beam 14c as shown in the graphical representation at C. The amplitude of the output of oscillator 40 is selected such that the low frequency intensity variation superimposed on output beam 14c is a relatively small percentage of the maximum intensity of the output beam.

Detector 34 which may comprise a photo-detector, a photo-cell, or in general, any electro-magnetic radiation detector, detects a small portion of output beam 14c which is reflected by beam splitter 32. The output of the photo detector 34 is coupled through low-pass filter 42 such that only the superimposed low-frequency monitoring signal is applied to phase comparator 44. The phase and magnitude of the monitoring signal provided at the output of low-pass filter 42 is continuously compared to the phase and magnitude of the low-frequency signal provided by low frequency oscillator 40. Accordingly, the output of phase comparator 44 provides an error signal which is proportional to the magnitude of its input signals as well as to the cosine function of the instantaneous phase difference between these same input signals.

The output of phase comparator 44 is coupled to compensation control 46 which, in turn, adjusts the birefringence or effective optical path length difference of compensation element 16. The above-mentioned phase difference experienced by beam 14 in passing through compensation element 16 is thus changed in a proper direction to compensate for variations of the intensity of the output beam, emerging from analyzer 22, which variations may be caused by variations in temperature or other parameters. As a result, the present invention provides an automatic control of the output beam intensity and will thus assure that a given output beam intensity, about which information signal modulation is to take place, is maintained.

In accordance with the invention compensation element 16 may comprise, for example, a Babinet-Soleil compensator. A Babinet-Soleil compensator is a mechanical device which typically comprises two wedge shaped transparent members having varying degrees of birefringence. The mechanical position of the respective wedged members are advanced relative to one another such that an optical beam passing therethrough exhibits varying degrees of birefringence in accordance with the positioning of the wedged members. The wedged members are advanced back and forth by means of a phase control knob. Accordingly, compensation control element 46 may comprise an electric stepping motor mechanically coupled to the phase control knob of the Babinet-Soleil compensation element. Thus, the degree of birefringence of compensation element 16 can be varied by applying electrical signals to the input of the stepping motor. Further, the input to control 46 can be arranged to advance the wedge members of element 16 to achieve the desired compensation in accordance with the phase and magnitude of the input signal to control 46.

Alternatively, compensation element 16 may comprise a temperature dependent, transparent birefringent material whose birefringence varies in accordance with the temperature of the element. Accordingly, compensation control 46 may comprise a heater assembly thermally coupled to element 16 to provide an operating temperature which varies as a function of the signals applied to the input of the heater assembly.

Figure 2:
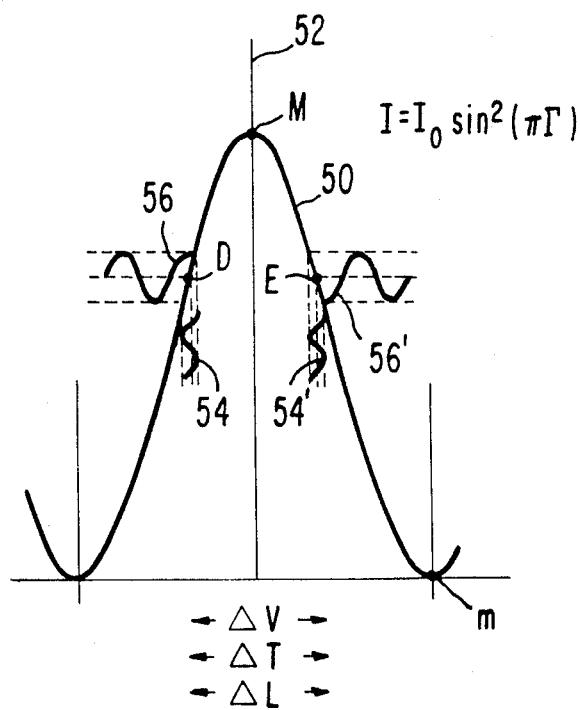
FIG. 2 is a graphical representation of the output intensity of the modulator of FIG. 1 as a function of various parameters affecting the output beam intensity.

For a better understanding of the operation of the system of FIG. 1, in accordance with the present invention, reference is now made to FIG. 2 wherein the intensity of the output beam emerging from analyzer 22 is plotted as a function of the various parameters affecting the electro-optic crystal material and therefore the output beam intensity. The curve is drawn at 50 and is symmetrical about the vertical axis 52. The output intensity, which is represented by curve 50, is given by the equation $$I = I_o \sin^2 (\pi \Gamma), \quad (1)$$

where $I_o$ is the maximum output beam intensity and $\Gamma$ is the retardation factor or total difference in optical path length of the electro-optic crystal measured in units of wavelengths of light. A variation of output beam intensity between the maximum output at M and the minimum output at m follows from a ½ λ variation of $\Gamma$ which also corresponds to a ½ λ optical path length difference.

For many electro-optic modulators, the retardation factor $\Gamma$ is directly proportional to the electric field applied thereto. Accordingly, the parameter $\Gamma$ as indicated in equation (1) or in FIG. 2, may constitute a measure of the voltage ($\Delta V$) applied to the electro-optic crystal modulator and thus the applied electric field strength. However, the same curve obtains when $\Gamma$ is a measure of the temperature ($\Delta T$) or a measure of the difference between the indices of refraction experienced by the ordinary and the extraordinary beam components propagating in the crystal material. Additionally, $\Gamma$ may represent the differential length variations ($\Delta L$) of the electro-optic crystal material or the modulator assembly caused by temperature variations or variations in mechanical alignment. It should now be clear that variations in these parameters, which variations occur as a result of temperature variations or variations in the applied electric field, or changes in the modulator alignment affecting its optical path length difference, all affect the intensity of the output beam radiation in the manner described by curve 50.

FIG. 2 also demonstrates the effect of superimposing a low-amplitude monitoring signal onto the input of the electro-optic crystal modulator and therefore the output beam itself. The amplitude and phase of the monitoring signal are represented at 54 and 54' on curve 50 of FIG. 2. Points D and E represent the operating points along curve 50 which result when a variation in output beam intensity occurs due to a variation in temperature or some other parameter. The resulting detected and filtered signals are represented by curves 56 and 56' in FIG. 2. It can be seen then that the phase and magnitude of the detected and filtered signal varies in accordance with the direction of the variation of the output intensity. Thus, it can be seen that when the intensity of the output beam is about its maximum or minimum operating point on curve 50, the resulting error signal output from phase comparator 44 will be minimum. However, if the second harmonic component of the detected and filtered signal is used to effect the comparison, the error signal output from phase comparator 44 will be a maximum at these two operating points.

It will be evident, accordingly, that the error signal output from phase comparator 44 can be used to automatically adjust the retardation factor $\Gamma$ or optical path length difference of the modulator system in order to maintain the intensity modulated output beam constant about a given value about which the modulation takes place. This results because the phase difference introduced by element 16 can be varied in one of two directions and the varying parameter also varies in one of two directions as indicated along the abscissa of FIG. 2. Accordingly, in accordance with the present invention, element 16 is caused to vary in a direction which continuously compensates for the output beam variation caused by the varying parameter.

The same error signal may be also utilized, in accordance with the present invention, by adding a DC component to the error signal to maintain a given output intensity value other than the maximum, M, or minimum, m, value as shown in FIG. 2. Further, various feedback techniques, as will be appreciated by those skilled in the art, can be deployed in the error signal network of FIG. 1. For example, the present invention may be used in an amplitude modulated system configuration wherein it is desired to modulate the output beam about a given output beam intensity value which is intermediate to the maximum and minimum values. In this case, the detector 34 and filter 42 of FIG. 1 can be arranged to detect a selected harmonic of the superimposed low frequency wave so as to obtain a desired discriminator type error signal variation about the given output beam intensity value.

An advantage of the present invention is the elimination of DC bias fields which are applied to the crystal modulators of many prior art systems in order to establish and maintain a given operating bias. That is, in the prior art, a DC bias signal is applied to, for example, input 20 of crystal modulator 18 of FIG. 1. In these prior art systems an error signal is then used to adjust the direct current bias applied to the modulator in accordance with output variations. The present invention, however, provides an electro-optic crystal modulator which establishes and maintains a desired operating point without necessitating an initial DC bias field, an adjustable compensation to the DC bias field or an equivalent adjustment to the level of the modulating signal. Thus, the output is maintained about the given maximum or optimum operating point solely by varying the birefringence or effective optical path length difference of the laser modulator system itself. It should be noted that modulator-amplifier 36 of FIG. 1, accordingly, need not be DC coupled and the otherwise attendant DC bias drift problems are also eliminated.

It should also be noted that the compensation element of the present invention, in addition to compensating for various parameter variations of the electro-optic material also compensates for similar variations of any other optical component which is part of the modulator system assembly. Further, the compensation element also acts to compensate for variations introduced into the modulator system by the compensation element itself.

Another advantage of the modulator system in accordance with the present invention is that the automatic optical bias control, including the compensation element, can be added to existing systems independent of and external to the existing modulator. The compensation element, in accordance with the present invention can be added at any point in the system between the laser source and the analyzer element from which the output beam emerges.

As discussed above, a still further advantage of the automatic optical bias control system of the present invention is that the output can be maintained constant about a given operating point without requiring excessively high field potentials as are applied to crystal modulators in prior art systems. This is of particular advantage in high-power lasers such as $CO_2$ lasers where the fields which are otherwise required to restore the output of the modulator system may be excessively high such as, for example, near the dielectric breakdown value of the crystal itself.

It will be understood that the present invention is not restricted in its application to visible light radiation, but applies equally well to any portion of the electromagnetic spectrum where modulation system components equivalent to the elements shown and described are used.

What has been taught, then, is a simple and effective optical bias control for laser modulators, which facilitates, notably, thermal or mechanical compensation for variations in output beam intensity resulting from variations in temperature and/or other parameters.

What is claimed is:

1. In apparatus for providing modulation of light, of the type which comprises: means including a light source for providing a beam of light radiation of a given frequency and polarized in a given direction; an analyzer positioned in the path of said beam; an electro-optic crystal modulator positioned in the path of said beam between said source and said analyzer for varying the polarization of said beam about said given direction; control means for applying an electric field to said crystal modulator, the polarization direction of the beam impinging on said analyzer being responsive to the magnitude of said electric field, wherein modulation of said electric field modulates the polarization direction of said impinging beam about said given direction, and wherein the polarization modulation of the impinging beam is converted into an intensity modulated output beam, emerging from said analyzer, of a given intensity value about which said intensity modulation takes place; means including photo-detecting means positioned to detect a portion of said intensity modulated output beam and provide an error signal of a phase and magnitude which is a function of any variations in the intensity of said output beam from said given intensity value: the improvement therein comprising:

a birefringent optical compensation element positioned external to said crystal modulator in the path of said beam between said source and said analyzer, said compensation element having a variable birefringence; and means responsive to said error signal for controlling the birefringence of said compensation element to maintain the intensity of said output beam at said given intensity value.

2. The apparatus according to claim 1, wherein: said optical compensation element is a temperature dependent birefringent material whose birefringence varies as a function of temperature; and said means responsive to said error signal includes a heater assembly thermally coupled to said temperature dependent birefringent material to vary the temperature of said birefringent material in accordance with said error signal.

3. The apparatus according to claim 1, wherein: said optical compensation element is a Babinet-Soleil compensator having a control knob wherein the position of said control knob determines the birefringence of said compensator; and said means responsive to said error signal includes a motor mechanically coupled to said control knob to vary the position of said control knob in accordance with said error signal.

4. The apparatus according to claim 1 wherein a relatively low-frequency, low amplitude monitoring signal modulates said electric field, said means including said photo-detecting means operating to generate said error signal by sampling said monitoring signal in said output beam and comparing said sample with said monitoring signal modulating said electric field.

* * * * *